Patented June 18, 1935

2,004,931

UNITED STATES PATENT OFFICE 2,004,931

FLUORINATION OF CARBON COMPOUNDS

Herbert Wilkens Daudt and Edwin Lorenzo Mattison, Wilmington, Del., assignors, by mesne assignments, to Kinetic Chemicals, Incorporated, Wilmington, Del., a corporation of Delaware No Drawing. Application March 20, 1931, Serial No. 524,214

33 Claims. (Cl. 260—162)

This invention relates to fluorine derivatives of organic compounds and more particularly to the preparation of such compounds from inorganic fluorine compounds. It especially contemplates a practical process for fluorination of organic compounds containing a halogen having an atomic weight greater than fluorine by use of heavy metal fluorides in the presence of a catalyst or carrier.

Applicants are aware that fluorine derivatives of aliphatic hydrocarbons have been made by the treatment, at high temperatures, of the corresponding iodo-, bromo-, and chloro-derivatives with the fluoride of silver or mercury (Beilsteins Handbuch der Organischen Chemie 4th auflage: 1918: Erster Band p. 59). Rathberg (Ber. 51 669–72; 1918) reacted silver fluoride with carbon-tetra-bromide at temperatures of 50–75° C. Meslans (Compt. rend. 114, 1020 and 1069; 1890) was able to prepare acetyl-fluoride by the action of acetyl-chloride upon the fluoride of any one of the metals antimony, arsenic and zinc. F. Swarts (Bull. Acad. Belg. (3) 24, 309 (1892), prepared fluoro trichloro methane by the action of antimony tri-fluoride and bromine upon carbon tetrachloride at temperatures of about 65° C.

The work in this field is well covered by the review of F. Swarts (Bull. Soc. Chim. 35, 1533; 1924). A very recent discussion of some fluorination processes is given by Midgley and Henne (Jour. Ind. & Eng. Chem. 22, 542–5; 1930).

This invention has for an object the provision of a novel fluorination process and one which is more efficacious than known processes in the fluorination of organic compounds. Further objects are the production of economic and commercial processes for the production of organic fluorine compounds, the production of processes which avoid the use of corrosive and toxic substances and processes which give high yields of the desired products. Other objects will appear hereinafter.

These objects are accomplished by treating acyclic halogen compounds with heavy metal fluorides in the presence of penta-valent antimony compounds or tri-valent antimony compounds and free halogen. The invention will be readily understood from a consideration of the following examples wherein the parts are given by weight.

Example I

In a suitable container (glass lined material may be used if desired) provided with a water cooled condenser there was prepared a mixture of 104 parts of anhydrous zinc fluoride, 15 parts of antimony tri-chloride, 150 parts of antimony penta-chloride and 77 parts of carbon-tetra-chloride. While actively stirring the mixture it was heated gradually to a temperature of about 75–115° C. This temperature range afforded an active refluxing in the condenser attached to the container. The vapors issuing from the reflux condenser were passed through a warm alkaline scrubber and then through a warm sulphuric acid scrubber. When the flow of vapor diminished, 77 additional parts of carbon-tetra-chloride were added to the reaction chamber and the refluxing continued until the flow of gas ceased. All of the vapors given off were condensed in a container maintained at about −50° C. by means of a suitable refrigerant, in this case, solid carbon dioxide. By means of fractional distillation the product was separated into di-fluoro-di-chloro-methane and fluoro-tri-chloro-methane. The boiling points of these materials were −30° C. and +25° C., respectively.

Example II

In a suitable condenser (glass lined material may be used if desired) provided with a water cooled condenser there was prepared a mixture of 104 parts of anhydrous zinc fluoride, 170 parts of antimony penta-chloride and 77 parts of carbon-tetra-chloride. The mixture was agitated and heated to a temperature of 75–115° C., which caused active refluxing in the condenser. The vapors issuing from the reflux condenser were passed through a warm alkaline scrubber and then through a warm sulphuric acid scrubber. When the flow of vapor diminished, 77 additional parts of carbon-tetra-chloride were added to the reaction chamber and the refluxing continued until the flow of gas ceased. All of the vapors given off were condensed in a container maintained at about −50° C. by means of a suitable refrigerant, in this case, solid carbon dioxide. By means of fractional distillation the product was separated into di-fluoro-di-chloro-methane and fluoro-tri-chloro-methane. The boiling points of these materials were −30° C. and +25° C., respectively.

Example III

In suitable equipment containing a mixture of 500 parts of lead fluoride and 375 parts of antimony tri-chloride there was placed 625 parts of carbon-tetra-chloride. The reaction chamber contained suitable stirring mechanism and an inlet for chlorine gas and was connected to a water cooled reflux condenser. While agitating the mixture the temperature was gradually raised to the boiling point which was about 80° C., thereafter during a period of 4 to 7 hours a slow stream of chlorine gas was passed into the mixture. The issuing vapors from the condenser were passed through slightly warmed (temperature 30–35° C.) scrubbers, the first of which contained dilute sodium hydroxide and the other solid potassium hydroxide. The vapors leaving the last scrubber were condensed by means of a condenser cooled to about —50° C. The product was separated by means of suitable fractionating equipment into its components. There were isolated fluoro-tri-chloro-methane and di-fluoro-di-chloro-methane, the latter of which was produced in the smaller proportion.

*Example IV*

One hundred (100) parts of calcium fluoride and 25 parts of lead fluoride were placed in a glass tube and heated to about 550° C. Then 300 parts of carbon-tetra-chloride containing 2 parts of antimony penta-chloride were slowly passed through the tube. The vapors were partially condensed by means of a condenser held at about 25° C. The condensate was then collected and together with additional carbon-tetra-chloride and, if desired, with additional antimony penta-chloride, was again circulated through the heated tube. The vapors remaining uncondensed in the above described condenser were scrubbed through a caustic soda solution and then through a sulphuric acid tower. The scrubbed and dried vapors were condensed by means of a condenser held at about —50° C. Di-fluoro-di-chloro-methane and fluoro-tri-chloro-methane were isolated by suitable fractionation.

*Example V*

Three hundred (300) parts of lead fluoride were placed in a glass tube and heated to about 400°C., then 300 parts of carbon-tetra-chloride containing 2 parts of antimony penta-chloride were passed slowly through the tube. The vapors were partially condensed by means of a condenser held at about 25° C. The condensate was then collected and together with additional carbon-tetra-chloride and, if desired, with additional antimony penta-chloride, was again circulated through the heated tube. The vapors remaining uncondensed in the above described condenser were scrubbed through a caustic soda solution and then through a sulphuric acid tower. The scrubbed and dried vapors were condensed by means of a condenser held at about —50° C. Di-fluoro-di-chloro-methane and fluoro-tri-chloro-methane were isolated by suitable fractionation.

In the examples the fluorination of carbon-tetra-chloride has been described for purposes of illustration. The fluorination of other acyclic halogen derivatives may be carried out in a similar manner. Special mention may be made of the desirable results obtained by using chloro and bromo derivatives of acyclic hydrocarbons.

With the antimony penta-chloride catalyst or carrier there may also be present an antimony tri-halide such as antimony tri-chloride or a free halogen such as chlorine. In the place of the antimony penta-chloride there may be used other antimony penta-halides in which the halogen has an atomic weight greater than fluorine, that is greater than 19. As an example there may be mentioned antimony penta-bromide.

The fluorides of the heavy metals are much more reactive than the neutral fluorine salts of other metals for example the alkali and alkaline earth metals. The heavy metal fluorides may afford active fluorination at temperatures approximating the refluxing temperatures of carbon-tetra-chloride or of the reaction masses containing it. By using smaller proportions of carbon-tetra-chloride in Examples I and III the refluxing temperature may be increased somewhat beyond the limits given. The reaction with heavy metal fluorides may also be carried out at high temperatures using the processes set out in Examples IV and V. As shown in Examples I and IV temperatures as low as 75° C. and as high as 550° C. are very desirable. The intermediate range 100° C. to 550° C. is even more meritorious.

In accordance with general usage, throughout the specification and claims, the expression "heavy metal" is used to cover metals having a specific gravity greater than four. The invention is not limited to the specific metals set out in the examples. Especially desirable results are obtainable with metals belonging to groups I, II, IV and VIII of the periodic table (Handbook of Chemistry and Physics . . . Fourteenth Edition, 1929, pages 490–1). Metals having a specific gravity greater than seven warrant special mention. Of these, those having a specific gravity between seven and fourteen are preferred. Bismuth fluoride also merits special mention.

Where the phrase "acyclic compounds" is used it is intended that it cover carbon compounds having an open chain for example paraffins, olefines and the like. The invention also contemplates carbon compounds containing an acyclic carbon atom as for example benzo-tri-chloride

$(C_6H_5CCl_3)$.

Where the word "fluorination" is used in the specification or claims, it is intended that it cover the introduction of fluorine into the molecule of the acyclic hydrocarbon, especially the introduction of fluorine by replacement of another halogen.

The order of adding the reacting components has no particular bearing on the production of the desired compound. The relative amounts of the materials and the temperatures given may differ greatly from those given in the examples. The processes herein described may be carried out under superatmospheric or subatmospheric pressure. It is not necessary that the process be carried out in corrosion resistant apparatus. The presence of water is detrimental to the process but does not entirely stop the reactions.

By providing suitable means for removing the chlorides formed as a result of the reactions of the invention it is possible to carry out the process in a continuous manner.

If desired the vapors may be compressed and subsequently condensed under pressure or the vapors may be fractionated into their various constituent parts immediately after their formation.

Where the original organic halogen derivative contains hydrogen a substitution of halogen for hydrogen may take place during the fluorination operation. This is particularly true if a free halogen such as chlorine is present in the reaction mass.

In general where the original organic acyclic halogen compound is unsaturated the addition of halogen and the introduction of fluorine may take place in the same operation. This reaction is especially likely to take place if a free halogen is present.

This invention has the advantage of being an economical process which does not utilize corrosive and toxic acids.

As many apparently widely different embodiments of this invention may be made without departing from the spirit and scope thereof, it is to be understood that we do not limit ourselves to the specific embodiments thereof except as defined in the appended claims.

We claim:

1. The process of preparing fluorinated acyclic compounds which comprises reacting a compound containing an acyclic carbon atom having joined thereto a halogen having an atomic weight greater than 19 and a heavy metal fluoride other than antimony trifluoride in the presence of a fluorination catalyst.

2. The process of claim 1 when carried out at pressures in excess of atmospheric pressure.

3. The process of claim 1 when carried out at pressures less than atmospheric pressure.

4. The process which comprises treating a compound containing an acyclic carbon atom having joined thereto a halogen having an atomic weight greater than fluorine, with a fluoride of a metal belonging to groups I, II, IV and VIII of the periodic table in the presence of a fluorination catalyst.

5. The process which comprises treating a compound containing an acyclic carbon atom having joined thereto a halogen having an atomic weight greater than fluorine, with bismuth fluoride in the presence of a fluorination catalyst.

6. The process which comprises treating a compound containing an acyclic carbon atom having joined thereto a halogen having an atomic weight greater than fluorine, with a fluoride of a metal having a specific gravity greater than 7 in the presence of a fluorination catalyst.

7. The process which comprises treating a compound containing an acyclic carbon atom having joined thereto a halogen having an atomic weight greater than fluorine, with a fluoride of a metal having a specific gravity between 7 and 14 in the presence of a fluorination catalyst.

8. The process which comprises treating a compound containing an acyclic carbon atom having joined thereto a halogen having an atomic weight greater than fluorine, with a fluoride of a heavy metal other than antimony in the presence of an antimony halide.

9. The process which comprises treating a compound containing an acyclic carbon atom having joined thereto a halogen having an atomic weight greater than fluorine, with a fluoride of a metal whose specific gravity is greater than 7 in the presence of an antimony halide.

10. The process which comprises treating a compound containing an acyclic carbon atom having joined thereto a halogen having an atomic weight greater than fluorine, with a fluoride of a heavy metal other than antimony in the presence of an antimony pentahalide.

11. The process which comprises treating a compound containing an acyclic carbon atom having joined thereto a halogen having an atomic weight greater than fluorine, with a fluoride of a heavy metal other than antimony in the presence of a catalyst comprising an antimony halide and a free halogen.

12. The process which comprises treating a compound containing an acyclic carbon atom having joined thereto a halogen having an atomic weight greater than fluorine with a fluoride of a metal belonging to groups I, II, IV and VIII of the periodic table in the presence of an antimony halide and free chlorine.

13. The process which comprises treating a compound containing an acyclic carbon atom having joined thereto a halogen having an atomic weight greater than fluorine with a fluoride of a metal having a specific gravity greater than 7 in the presence of an antimony chloride.

14. The process of claim 13 when carried out at pressures in excess of atmospheric pressure.

15. The process of claim 13 when carried out at pressures less than atmospheric pressure.

16. The process which comprises treating a compound containing an acyclic carbon atom having joined thereto a halogen having an atomic weight greater than fluorine with a fluoride of a metal having a specific gravity between 7 and 14 in the presence of antimony pentachloride.

17. The process of preparing fluoro-chloro derivatives of methane which comprises reacting carbon-tetra-chloride and a fluoride of a metal belonging to groups I, II, IV and VIII of the periodic table in the presence of an antimony pentahalide.

18. The process of preparing fluoro-chloro derivatives of methane which comprises reacting carbon-tetra-chloride and a fluoride of a metal belonging to groups I, II, IV and VIII of the periodic table in the presence of an antimony pentahalide at temperatures between about 100° C and about 550° C.

19. The process of preparing fluoro-chloro derivatives of methane which comprises reacting carbon-tetra-chloride and a fluoride of a metal belonging to groups I, II, IV and VIII of the periodic table in the presence of an antimony pentahalide at a temperature of about 50° C. to about 100° C.

20. The process of preparing fluoro-tri-chloro methane which comprises reacting carbon-tetra-chloride and a fluoride of a metal belonging to groups I, II, IV and VIII of the periodic table in the presence of an antimony pentahalide at a temperature of about 50° C. to about 100° C.

21. The process of preparing fluoro-chloro derivatives of methane which comprises refluxing carbon-tetra-chloride and a fluoride of a metal having a specific gravity greater than 7 in the presence of an antimony pentahalide.

22. The process which comprises treating a compound containing an acyclic carbon atom having joined thereto a halogen having an atomic weight greater than fluorine with a fluoride of a heavy metal having a specific gravity between 7 and 14 in the presence of an antimony tri-halide and a free halogen.

23. The process which comprises treating a saturated acyclic compound containing a halogen having an atomic weight greater than fluorine, with a fluoride of a heavy metal in the presence of an antimony halide and free chlorine.

24. The process which comprises treating a saturated acyclic compound containing a halogen having an atomic weight greater than fluorine and an antimony tri-halide with a fluoride of a heavy metal having a specific gravity between 7 and 14 and free chlorine.

25. The process of preparing fluorinated carbon compounds which comprises reacting a compound containing an acyclic carbon atom having joined thereto a halogen having an atomic weight greater than 19 and a heavy metal fluoride other than antimony fluoride in the presence of an antimony penta-halide.

26. The process of claim 25 when carried out at pressures in excess of atmospheric pressure.

27. The process which comprises treating a compound containing an acyclic carbon atom having joined thereto a halogen having an atomic weight greater than fluorine, with a fluoride of a metal belonging to groups I, II, IV and VIII of the periodic table in the presence of an antimony penta-halide.

28. The process which comprises treating a compound containing an acyclic carbon atom having joined thereto a halogen having an atomic weight greater than fluorine, with bismuth fluoride in the presence of an antimony penta-halide.

29. The process which comprises treating a compound containing an acyclic carbon atom having joined thereto a halogen having an atomic weight greater than fluorine, with a fluoride of a metal having a specific gravity greater than 7 in the presence of an antimony penta-halide.

30. The process which comprises treating a compound containing an acyclic carbon atom having joined thereto a halogen having an atomic weight greater than fluorine, with a fluoride of a metal having a specific gravity between 7 and 14 in the presence of an antimony penta-halide.

31. The process which comprises treating a member of the group consisting of saturated aliphatic compounds and alphyl compounds containing an acyclic carbon atom having joined thereto a halogen having an atomic weight greater than fluorine, with a fluoride of a metal whose specific gravity is greater than 7 in the presence of an antimony halide.

32. The process of preparing fluorinated carbon compounds which comprises reacting a carbon compound containing an acyclic carbon atom having joined thereto halogen having an atomic weight greater than 19 and in the presence of an antimony tri-halide and a halogen with the fluoride of a heavy metal in the absence of antimony fluoride.

33. The process which comprises treating an alphyl hydrocarbon containing a halogen atom, having an atomic weight greater than fluorine, in the side chain with a fluoride of a metal whose specific gravity is greater than 7 in the presence of an antimony penta-halide.

HERBERT WILKENS DAUDT.
EDWIN LORENZO MATTISON.